(12) United States Patent
Bahr et al.

(10) Patent No.: US 8,282,899 B2
(45) Date of Patent: Oct. 9, 2012

(54) ABSORPTION METHOD FOR RECOVERING GAS CONTAMINANTS AT HIGH PURITY

(75) Inventors: David A. Bahr, Chicago, IL (US); Lamar A. Davis, West Dundee, IL (US)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 13/222,430

(22) Filed: Aug. 31, 2011

(65) Prior Publication Data

US 2011/0308388 A1 Dec. 22, 2011

Related U.S. Application Data

(62) Division of application No. 12/436,480, filed on May 6, 2009, now abandoned.

(51) Int. Cl.
*B01D 53/14* (2006.01)
*B01D 19/00* (2006.01)

(52) U.S. Cl. ............ 423/226; 423/220; 95/156; 95/169; 95/175; 95/176; 95/177; 95/187; 95/203; 95/204; 95/236; 95/237

(58) Field of Classification Search .................. 423/210, 423/220, 226; 95/149, 156, 172–77, 183, 95/187, 203, 204, 230, 236, 169
See application file for complete search history.

(56) References Cited

U.S. PATENT DOCUMENTS

2007/0028774 A1* 2/2007 Rochelle .................. 95/236

FOREIGN PATENT DOCUMENTS

CA 1295810 * 2/1992

OTHER PUBLICATIONS

Addicks et al., "Solubility of Carbon Dioxide and Methane in Aqueous Methyldiethanolamine Solutions." J. Chem. Eng. Data (2002), vol. 47, pp. 855-860. Published on Web May 1, 2002.*

* cited by examiner

*Primary Examiner* — Daniel C McCracken
*Assistant Examiner* — Daniel Berns
(74) *Attorney, Agent, or Firm* — Mark Goldberg

(57) ABSTRACT

Solvent absorption processes for separating components of an impure feed gas are disclosed. The processes involve two stages of gas-liquid contacting, namely a first, absorption stage and a second, stripping stage. In the case of a carbon dioxide ($CO_2$)-containing methane gas as an impure feed gas, contacting, in the stripping stage, the solvent effluent from the absorption stage with a recycled vapor fraction of the solvent effluent from the stripping stage can improve the recovery and purity of not only the methane (and/or other light hydrocarbons in the impure feed gas), but also that of the $CO_2$ contaminant gas.

8 Claims, 1 Drawing Sheet

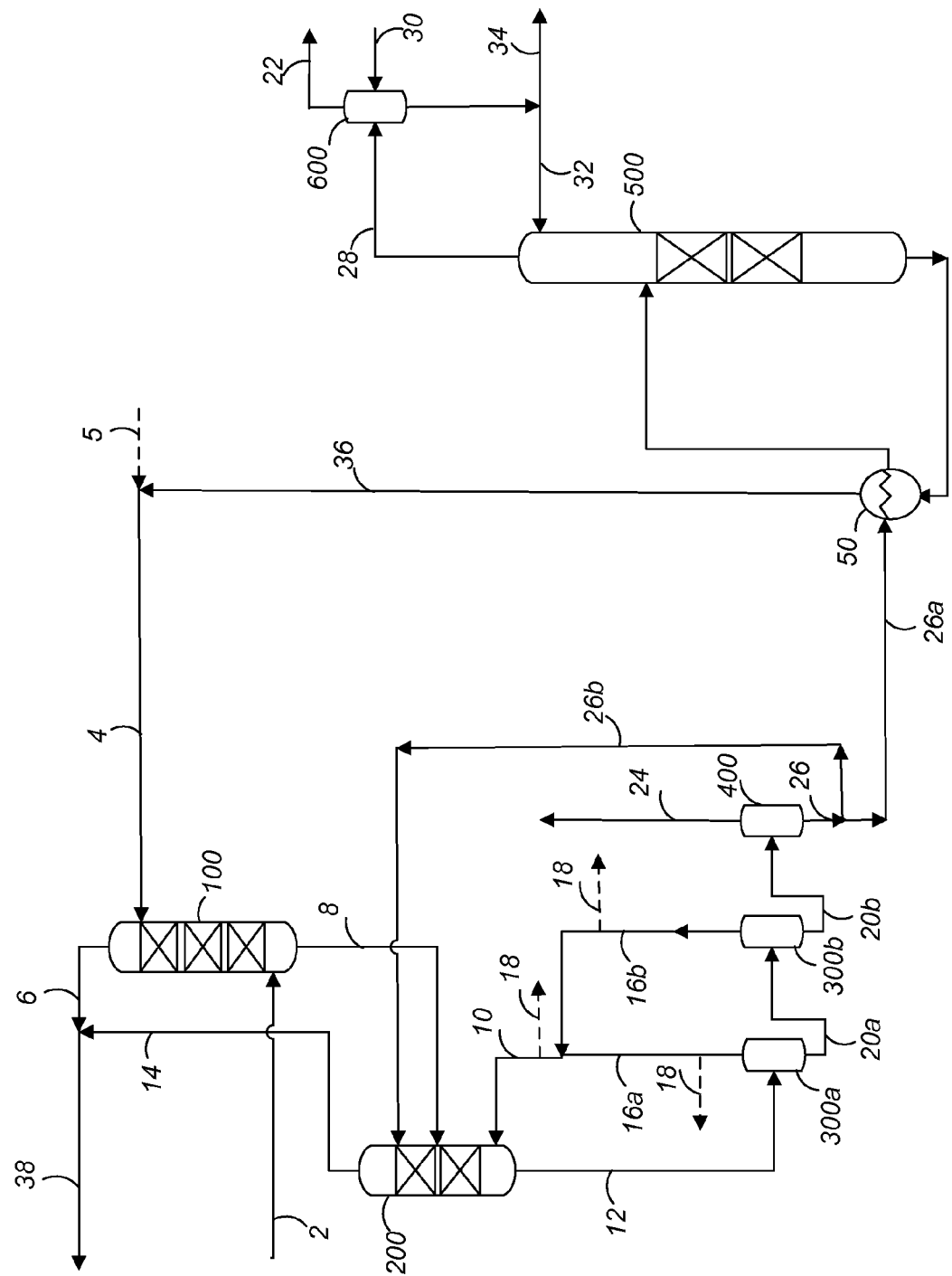

ABSORPTION METHOD FOR RECOVERING GAS CONTAMINANTS AT HIGH PURITY

CROSS-REFERENCE TO RELATED APPLICATION

This application is a Division of application Ser. No. 12/436,480 filed May 6, 2009, now abandoned, the contents of which are hereby incorporated by reference in its entirety.

FIELD OF THE INVENTION

The present invention relates to gas separation methods, for example the separation of contaminant carbon dioxide ($CO_2$) from methane using a solvent absorption process. In a two-stage, absorption/stripping operation, recycling a vapor fraction of the liquid solvent-containing stream exiting the stripper bottoms improves the purity of the recovered carbon dioxide.

DESCRIPTION OF RELATED ART

The removal of carbon dioxide ($CO_2$) from predominantly light hydrocarbon-(e.g., methane-) containing, impure gas streams is desired, among other reasons, to improve the heating value of the purified gas product for pipeline transmission. Differences in a number of properties between $CO_2$ and light hydrocarbons can serve as potential bases for gas separations. These differences include solubility, acidity in aqueous solution, and molecular size and structure. Possible separations can therefore rely on physical or chemical absorption into liquid solvents, pressure swing adsorption with solid adsorbents, and membrane systems.

Liquid solvent absorption (i.e., "wet") systems, for example, are commonly used for natural gas purification to remove minor amounts of $CO_2$. This contaminant can be preferentially absorbed in physical solvents such as a dimethylethers of polyethylene glycol or chemical solvents such as alkanolamines or alkali metal salts. The resulting $CO_2$-rich (i.e., "loaded") solvent is subsequently regenerated by heating to recover both $CO_2$ and a regenerated solvent that can be recycled for further use in absorption. Solvent regeneration is also normally conducted at a reduced pressure relative to the upstream absorption pressure, to promote vaporization of absorbed $CO_2$ from the solvent. The solvent absorption and solvent regeneration by heating are usually carried out in different columns containing packing, bubble plates, or other vapor-liquid contacting devices to improve the efficiency of mass transfer between phases. The $CO_2$ may be recovered in more than one stream, including vapor fractions of flash separators and regenerator column vapor effluents.

Chemical solvents, and particularly amines and other basic compounds, react with contaminant $CO_2$, an acid gas, to form a contaminant-solvent chemical bond. Considerable energy release is associated with this bond formation during the thermodynamically-favored, acid-base reaction. Due to the substantial heat input required to break the bonds of the heat-stable salts formed as chemical reaction products, chemical solvents are not economically regenerated. Physical solvents, on the other hand, do not react chemically with gas contaminants, but instead promote physical absorption based on a higher contaminant equilibrium solubility at its partial pressure in the impure gas (i.e., a higher Henry's law constant).

Physical solvents that remain chemically non-reactive with the impure gas stream are therefore desirable in absorption systems due to the ease of solvent regeneration. However, the removal of a given contaminant gas using a physical solvent is limited by its partial pressure driving force. Also, while the contaminant may be effectively removed from a desired gas such as methane, the recovery of the contaminant itself in a purified form remains problematic. For example, natural gas streams and coalbed methane both contain high quantities of methane and can be purified by the selective physical absorption of contaminant $CO_2$. However, the $CO_2$ contaminant is not easily recovered at high purity using conventional absorption systems, without significant additional costs. Yet obtaining purified $CO_2$ as a separated contaminant of an impure methane gas stream would enhance its value for industrial applications. One use of particular interest is enhanced oil recovery, in which $CO_2$ is injected into an oil reservoir where it dissolves the oil in place, thereby reducing its viscosity and making it more mobile for movement toward the producing well.

There is consequently a need in the art for gas purification methods in which contaminants that are initially present in only minor amounts are recovered at high purity levels.

SUMMARY OF THE INVENTION

The present invention is associated with the discovery of solvent absorption processes for separating a carbon dioxide ($CO_2$) contaminant of methane and/or other light hydrocarbons at high purity. The processes involve two stages of gas-liquid contacting, namely a first, absorption stage and a second, stripping stage. The absorption stage provides nearly complete removal of $CO_2$, by preferential absorption of this component from an impure light hydrocarbon-containing feed gas, into a physical solvent. In the case of a methane-containing feed gas, for example, the resulting solvent exiting the absorption stage contains absorbed quantities of both $CO_2$ and methane, with the relative absorbed $CO_2$:absorbed methane ratio exceeding the $CO_2$:methane ratio in the impure feed gas, due to the absorption selectivity of the physical solvent for $CO_2$. Consequently, the gas or vapor phase exiting the first stage is enriched in methane, compared to the feed gas.

The liquid effluent from the absorption stage nevertheless contains a significant quantity of methane, despite the relatively lower quantity of this desired, non-preferentially absorbed component. The second, stripping stage beneficially removes much of this absorbed methane into a second methane-enriched gas, which may be combined with the methane-enriched gas exiting the absorption stage. Importantly, it has been discovered that contacting, in the stripping stage, the solvent effluent from the absorption stage with a recycled vapor fraction of the solvent effluent from the stripping stage can improve the recovery and purity of not only the methane (and/or other light hydrocarbons in the impure feed gas), but also that of the $CO_2$ contaminant gas.

The solvent effluent from the absorption stage can therefore be stripped using, for example, all or part of a flash separator vapor fraction obtained from reducing the pressure of the solvent effluent from the stripping stage. This pressure reduction, which may be performed in one or more stages to provide one or more vapor fractions (portions of which, alone or in any combination, can be recycled to the stripping stage), can be used in conjunction with subsequent heating of the resulting gas-depleted liquid fraction of the stripping stage solvent effluent to regenerate the solvent.

Overall, therefore, aspects of the invention are associated with the significant benefits derived from "backstripping" of the first, absorption stage solvent effluent with a recycled vapor fraction (e.g., from flash separation) of the liquid effluent from the stripping stage. The benefits of conducting the second stripping stage in this manner include not only an enhanced recovery of methane, initially absorbed in the solvent after the first absorption stage, but also effective purification of the $CO_2$ that remains absorbed in the solvent effluent after the second stage. This absorbed $CO_2$ is subsequently recovered as $CO_2$ product at high purity, upon regenerating the solvent at elevated temperature. In a representative embodiment, the $CO_2$ product gas has a purity such that it is directly applicable in a number of industrial applications, including enhanced oil recovery.

These and other aspects and features relating to the present invention are apparent from the following Detailed Description.

BRIEF DESCRIPTION OF THE DRAWING

The FIGURE depicts a representative two-stage process for purifying an impure, methane-containing feed gas to provide the recovered, carbon dioxide ($CO_2$) as a purified product gas.

The FIGURE is to be understood to present an illustration of the invention and/or principles involved. Details including pumps, compressors, heaters, chillers, reboilers, condensers, solid filtration and liquid knockout devices, instrumentation and control loops, and other items not essential to the understanding of the invention are not shown. As is readily apparent to one of skill in the art having knowledge of the present disclosure, gas purification methods according to various other embodiments of the invention, will have configurations and components determined, in part, by their specific use.

DETAILED DESCRIPTION

The invention is directed to gas purification methods in which a contaminant, present as a minor component of an impure feed gas, is selectively absorbed into a solvent. The methods advantageously recover significant portions of the impure feed gas components, including the contaminant, in purified product gas streams. Representative impure gas streams include those comprising light hydrocarbons (e.g., $C_1$-$C_3$ hydrocarbons such as methane), and non-hydrocarbon gas contaminants, such as carbon dioxide ($CO_2$). Examples of such gas streams include natural gas and coalbed methane, which comprise predominantly methane and also comprise $CO_2$ in an amount from about 1% to about 10% by volume. For simplicity, the invention is described hereinafter with respect to such methane and $CO_2$ systems with the latter component being present at contaminant levels, although it will be appreciated that the invention is broadly applicable to the purification of impure gas feeds in which a contaminant, present in an minor amount, is preferentially absorbed into a liquid solvent, and particularly a physical solvent.

Representative embodiments of the invention are therefore directed to gas purification methods involving two contacting stages. In the first, absorption contacting stage, an impure feed gas is contacted with a solvent. In the second contacting stage, the "loaded" solvent from the first stage, comprising absorbed components of the impure feed gas, is subjected to stripping, meaning that a vapor is introduced to strip or drive off at least some of these absorbed components, into a gas effluent from the stripping stage. The absorption and stripping stages are normally each carried out in two separate absorber and stripper vessels, with liquid solvent streams flowing downwardly toward a solvent effluent outlet, countercurrent to gas streams flowing upwardly toward a gas effluent outlet. It is, however, possible for absorption and stripping to be performed in a single vessel, such as in a stacked arrangement in upper and lower sections of the vessel, respectively.

According to the present invention, the vapor used for the stripping stage is a recycled vapor fraction of the solvent effluent from this stripping stage. The significant commercial advantages associated with the use of this recycled vapor in the stripping stage are discussed above.

A gas purification method according to an exemplary embodiment therefore comprises contacting an impure feed gas comprising methane and $CO_2$ with a solvent, and particularly a physical solvent that selectively (or preferentially) absorbs $CO_2$ over methane. Representative physical solvents include propylene carbonate, tributyl phosphate, methanol, tetrahydrothiophene dioxide (or tetramethylene sulfone). Others include alkyl- and alkanol-substituted heterocyclic hydrocarbons such as alkanolpyridines (e.g., 3-(pyridin-4-yl)-propan-1-ol) and alkylpyrrolidones (e.g., n-methylpyrrolidone), as well as dialkylethers of polyethylene glycol, with polyethylene glycol dimethyl ether being a preferred physical solvent. The feed gas-solvent contacting in a first contacting stage therefore provides (i) a gas with a higher methane content than the feed gas (i.e., a methane-enriched gas) and (ii) a solvent effluent comprising the absorbed $CO_2$ as well as some absorbed methane, with (i) and (ii) exiting the first contacting stage as vapor and liquid phases, respectively.

The first stage solvent effluent is then contacted, in a second stage of contacting (a stripping stage), with a recycled vapor fraction of the solvent effluent of this contacting stage. The second stage solvent effluent is obtained as a liquid phase exiting this stage, generally having a reduced quantity of absorbed methane relative to the first stage solvent effluent, as a result of a portion of this absorbed methane being stripped with the recycled vapor fraction. The second stage of contacting also generally provides a second methane-enriched gas (i.e., having a higher methane content than the recycled vapor fraction), that exits the second stage of contacting as a vapor phase. The vapor phases or methane-enriched gases exiting both the first and second contacting stages may be combined to provide a purified methane product gas, which, according to representative embodiments of the invention comprises methane in an amount of generally at least about 90% (e.g., in the range from about 90% to about 99%) by volume, typically at least about 93% (e.g., in the range from about 93% to about 99%) by volume, and often at least about 95% (e.g., in the range from about 90% to about 99%) by volume, on a water-free basis. According to representative embodiments of the invention, generally at least about 95%, typically at least about 98%, and often at least about 99% or substantially all (e.g., at least about 99.5%) of the methane originally present in the impure feed gas is recovered in the purified methane product gas.

The recycled vapor fraction of the second stage solvent effluent is therefore used, in the second contacting stage, to strip a portion of the methane that is initially absorbed into the liquid solvent after the first contacting stage. This portion of methane, stripped into the vapor phase exiting the second contacting stage, represents an additionally recovered amount, beyond that recovered in the vapor phase exiting the first stage. The recycled vapor fraction is obtained by vaporization of some portion of the gases absorbed into the liquid solvent effluent exiting the second contacting stage as a liquid phase. This vaporization may be achieved by depressurization and/or heating of the second stage solvent effluent. Generally, the vapor fraction that is recycled to the second contacting stage is obtained from one or more flash separations of the second stage solvent effluent. In the case of a plurality of flash separations (e.g., the use of two flash separations in series), successively lower pressure flash separations (e.g., at high pressure followed by medium pressure) may be utilized to provide a plurality of vapor fractions, all or a portion of which may be combined to provide the recycled vapor fraction. The flash separation pressures are generally all lower than the pressure used in the second, stripping stage.

A plurality of flash separations are therefore often performed in separate flash separators, although multiple stages of vapor-liquid flashing or equilibrium stages may be combined in a single vessel, albeit at an essentially constant pressure, such as a distillation or fractionation column having a section containing packing, trays, or other vapor-liquid contacting devices. Distillation at one pressure, preceded or followed by flash separation at a different pressure, is also possible. In any event, one or more vapor fractions of the second stage solvent effluent are obtained, at least a portion of which are recycled, as the recycled vapor fraction, back to the second stage of contacting as described above.

The vaporization of a fraction (or fractions) of the second stage solvent effluent, provides an associated, gas-depleted liquid fraction of the second stage solvent effluent. Because $CO_2$ is preferentially absorbed in the solvent over methane, the absorbed gases remaining in the gas-depleted liquid fraction or solvent phase, after the removal of the vapor fraction(s), are enriched in $CO_2$. Therefore, the purified $CO_2$ remaining in the gas-depleted liquid fraction is advantageously recovered as a product gas, in addition to the purified methane product gas as discussed above. Often, the purified $CO_2$ product gas is recovered after heating at least a portion of the gas-depleted liquid fraction of the second stage solvent effluent, as necessary to regenerate the solvent. The purified $CO_2$ product gas recovered from all or a portion of the gas-depleted liquid fraction, according to representative embodiments of the invention, comprises $CO_2$ in an amount of generally at least about 90% (e.g., in the range from about 90% to about 99%) by volume, typically at least about 92% (e.g., in the range from about 92% to about 99%) by volume, and often at least about 94% (e.g., in the range from about 94% to about 99%) by volume, on a water-free basis. In a specific embodiment, for example, the portion of the gas-depleted liquid fraction that is regenerated is obtained as a $CO_2$-rich solvent stream, which is a liquid fraction, after a flash separation (e.g., at low pressure) to provide a fuel gas as a vapor fraction that is not recycled to the second contacting stage. According to representative embodiments of the invention, generally at least about 50% (e.g., in the range from about 50% to about 95%), typically at least about 60% (e.g., in the range from about 60% to about 90%), and often at least about 65% (e.g., in the range from about 65% to about 80%) of the $CO_2$ originally present in the impure feed gas is recovered in the purified $CO_2$ product gas.

An exemplary, two-stage, gas purification process according to the invention as described herein, is illustrated in the FIGURE. As shown, impure feed gas stream 2 comprising methane and $CO_2$ is contacted with solvent stream 4 in counter-current absorber 100 to provide, as exiting vapor and liquid phases, methane-enriched overhead gas stream 6 and first stage solvent effluent bottoms stream 8 comprising absorbed portions of methane and $CO_2$. This first stage solvent effluent 8 is then passed to counter-current stripper 200 where it is contacted with recycled vapor fraction 10 of second stage solvent effluent bottoms stream 12. Vapor and liquid phases exiting the counter-current stripper 200 are, respectively, second methane-enriched overhead gas stream 14 and the solvent effluent bottoms stream 12. It is generally desired to combine methane-enriched overhead gas stream 6 from absorber 100 and second methane-enriched overhead gas stream 14 from stripper 200, with the combined stream being purified methane product gas stream 38 having a methane purity as described above and suitable for pipeline transmission.

Flash separation of solvent effluent bottoms stream 12 in high pressure and medium pressure flash separators 300a, 300b provides high and medium pressure vapor fractions 16a, 16b, respectively, which are combined and recycled to a lower section counter-current stripper 200 as recycled vapor fraction 10. Appropriate gas compressors (not shown) are used to flow vapor fractions 16a, 16b, and recycled vapor fraction 10 from both high and medium pressure flash separators 300a, 300b, to the counter-current stripper 200, operating at a higher pressure. In representative embodiments, counter-current stripper 200, as well as counter-current absorber 100, operate generally at a pressure in the range from about 41 barg (600 psig) to about 83 barg (1200 psig), and normally in the range from about 55 barg (800 psig) to about 69 barg (1000 psig). The high and medium pressure flash separators 300a, 300b operate generally at a pressure of less than about 27 barg (400 psig) (e.g., in the range from about 2 barg (30 psig) to about 27 barg (400 psig)). For example, high pressure flash separator 300a may be maintained at a pressure in the range from about 21 barg (300 psig) to about 27 barg (400 psig), and low pressure flash separator 300b may be maintained at a pressure in the range from about 2 barg (30 psig) to about 14 barg (200 psig).

According to other embodiments, recycled vapor fraction 10 may comprise only a portion of high pressure vapor fraction 16a, a portion of medium pressure vapor fraction 16b, or portions of both of these vapor fractions 16a, 16b. For example, optional purge stream 18 may be used in some embodiments to reduce the steady-state content of one or more components of impure feed gas accumulating in vapor fractions 16a, 16b. Optional purge stream may remove portions of vapor fractions 16a, 16b, or may remove a portion of the combination of these vapor fractions 16a, 16b, with the portion that is not purged being passed to counter-current stripper 200 as recycled vapor fraction 10.

As a result of flash separations to provide vapor fractions 16a, 16b, corresponding liquid fractions 20a, 20b are also provided, generally at the successively lower pressures of high and medium pressure flash separators 300a, 300b. Corresponding liquid fractions 20a, 20b also have remaining absorbed gases with successively increasing contents of $CO_2$ relative to methane and other components. The last liquid fraction 20b, having a corresponding vapor fraction 16b (resulting from the last flash separation in flash separator 300b), with at least a portion thereof being recycled to counter-current stripper 200, is namely gas-depleted liquid fraction 20b of the second stage solvent effluent bottoms stream 12.

Purified $CO_2$ product gas stream 22 is recovered from gas-depleted liquid fraction 20b, for example by heating at least a portion of this stream to regenerate the solvent. In the specific embodiment illustrated in the FIGURE, for example, gas-depleted liquid fraction 20b is passed to an low pressure flash separator 400, normally operating at a lower pressure than medium pressure flash separator 300b. Flash separation of gas-depleted liquid fraction 20b provides fuel gas stream 24 as a vapor fraction and $CO_2$-rich solvent stream 26 as a liquid fraction. Fuel gas stream 24 is often a relatively small vapor stream having a significant amount of methane, for example in the range from about 20% to about 50% by volume, with this vapor stream being in equilibrium with $CO_2$-rich solvent stream 26 at a typical pressure of low pressure flash separator 400 in the range from about 0.5 barg (7 psig) to about 5 barg (75 psig). $CO_2$-rich solvent stream 26 is then heated to recover the remaining gas absorbed therein and having a significantly higher $CO_2$ content.

As shown in the FIGURE, $CO_2$-rich solvent stream 26 is divided into portions 26a, 26b, with one portion 26b being recycled to an upper section of counter-current stripper 200 and another portion 26a being passed to feed/effluent heat exchanger 50 of solvent regenerator 500. Feed/effluent heat exchanger 50 is used in conjunction with solvent reboiler (not shown) and optionally one or more heaters of solvent regenerator 500, to heat the portion 26a of the $CO_2$-rich solvent stream from which $CO_2$ is recovered. This $CO_2$-rich solvent portion 26a, as an inlet to solvent regenerator 500, is typically heated to a temperature in the range from about 38° C. (100° F.) to about 204° C. (400° F.), and often in the range from about 66° C. (150° F.) to about (149° C.) 300° F., depending on the particular solvent and component(s) of impure gas stream 2 to be recovered. In an exemplary embodiment in which the solvent comprises dimethyl ethers of polyethylene glycol, the solvent is generally heated to a temperature of at least about 150 C (302° F.) (e.g., from about 150° C. (302° F.) to about 204° C. (400° F.)) to regenerate the solvent and recover purified $CO_2$ product gas stream 22.

In the exemplary embodiment depicted in the FIGURE, purified $CO_2$ product gas stream 22 is recovered from overhead vapor stream 28 of solvent regenerator 500, generally after this stream is passed through an overhead condenser (not shown) and overhead reflux drum 600 to which a make-up water stream 30 may be added and from which (i) purge water stream 34 for impurity removal and/or (ii) overhead reflux liquid stream 32 for return to solvent regenerator 500, may be withdrawn. Purified $CO_2$ product gas stream 22 advantageously has a purity level as discussed above, which is suitable for a number of industrial applications, including enhanced oil recovery.

Regenerated solvent stream 36 is recovered from a bottom section of solvent regenerator 500, substantially depleted of all absorbed gases, and may be cooled by heat exchange against $CO_2$-rich solvent portion 26a using heat exchanger 50 and further cooled using a chiller (not shown) prior to introduction into counter-current absorber 100. In general, regenerated solvent stream 36 is combined with optional make-up solvent stream 5 to provide solvent stream 4 that is introduced to counter-current absorber 100 as described above. Optional make-up solvent stream 5 replaces the total solvent losses throughout the two-stage gas purification process.

Overall, aspects of the invention are associated with processes for purifying impure feed gas streams which advantageously allow the recovery of components of these gas streams at high purity. The processes comprise contacting the impure feed gas with a solvent in an absorption stage and a stripping stage and recycling a vapor fraction of a solvent effluent from the stripping stage, back to the stripping stage. An exemplary impure feed gas stream is a predominantly methane-containing gas stream having $CO_2$ as an impurity or contaminant in an amount from about 1% to about 10% by volume. Those having skill in the art will recognize the applicability of the methods disclosed herein to any of a number of gas purification processes, and particularly those utilizing a physical solvent that preferentially absorbs the contaminant that is to be recovered at high purity. It will also become apparent that embodiments of the invention disclosed herein will use a smaller or larger number of flash separations and/or other types of separations, to provide the recycled vapor fraction, relative to the specific embodiment illustrated in the FIGURE.

Those having skill in the art, with the knowledge gained from the present disclosure, will recognize that various changes could be made in the above processes without departing from the scope of the present disclosure. Mechanisms used to explain theoretical or observed phenomena or results, shall be interpreted as illustrative only and not limiting in any way the scope of the appended claims.

The following example is set forth as representative of the present invention. This example is not to be construed as limiting the scope of the invention as other equivalent embodiments will be apparent in view of the present disclosure and appended claims.

Example

The two-stage gas purification process illustrated in the FIGURE above was simulated using chemical process simulation software, namely ASPEN PLUS® (Aspen Technology, Inc., Burlington, Mass., USA) with a proprietary properties package. The model impure feed gas chosen for this simulation contained 95% and 5% by volume of methane and $CO_2$, respectively. The physical solvent chosen was a commercial solvent used in the SELEXOL® process licensed by UOP, LLC (Des Plaines, Ill.), containing dimethyl ethers of propylene glycol.

The results of the simulation showed that more than 99.5% of the methane present in the impure feed gas could be recovered, in the combined, methane-enriched gas streams exiting the counter current absorber and stripper columns as vapor phases (i.e., the purified methane product gas). The combined stream, namely the methane product gas stream, had a methane purity of greater than 96.8% by volume on a water-free basis. Importantly, using the flow scheme in the FIGURE, in which vapor fractions of the solvent effluent from the counter-current stripper were recycled back to the stripper, allowed more than 67% of the $CO_2$ present in the impure gas feed to be recovered as a purified $CO_2$ product gas stream exiting the solvent regenerator as a vapor phase. This product gas stream had a $CO_2$ purity of greater than 97% by volume on a water-free basis.

This high $CO_2$ purity would be acceptable, without further purification, for use in enhanced oil recovery.

The invention claimed is:

1. A two-stage gas purification process comprising:
    a) contacting an impure feed gas stream comprising methane and $CO_2$ and a physical solvent stream in a counter-current absorber to provide a first methane-enriched overhead gas stream and a first stage solvent effluent bottoms stream comprising absorbed methane and absorbed $CO_2$;
    b) providing a second stage solvent effluent bottoms stream and contacting the first stage solvent effluent bottoms stream and a recycled vapor fraction of the second stage solvent effluent bottoms stream in a counter-current stripper to provide a second methane-enriched overhead gas stream;
    c) flash separating the second stage solvent effluent bottoms stream in one or more flash separators to provide (i) one or more vapor fractions of the second stage solvent effluent bottoms stream and (ii) a gas-depleted liquid fraction of the second stage solvent effluent bottoms stream; and
    d) recovering a purified $CO_2$ product gas stream from the gas-depleted liquid fraction of the second stage solvent effluent bottoms stream.

2. The two-stage gas purification process of claim 1, wherein step c) comprises flash separating the second stage solvent effluent bottoms stream in two flash separators to provide high and medium pressure vapor fractions, and wherein the recycled vapor fraction comprises at least a portion of each of the high and medium pressure vapor fractions.

3. The two-stage gas purification process of claim 1, wherein step d) comprises flash separating the gas-depleted liquid fraction to provide a fuel gas stream as a vapor fraction and a $CO_2$-rich solvent stream as a liquid fraction, and wherein a second purified $CO_2$ product gas stream is recovered after heating at least a portion of the $CO_2$-rich solvent stream to recover the solvent.

4. The two-stage gas purification process of claim 3, wherein the second purified $CO_2$ product gas stream comprises $CO_2$ in an amount of at least about 90% by volume on a water-free basis and is recovered after heating at least a portion of the $CO_2$-rich solvent stream to a temperature of at least about 150° C. (302° F.) to regenerate the solvent.

5. The two-stage gas purification process of claim 1, further comprising combining the first methane-enriched overhead gas stream from the absorber and the second methane-enriched overhead gas stream from the stripper to provide a purified methane product gas stream comprising methane in an amount of at least about 95% by volume on a water-free basis.

6. The two-stage gas purification process of claim 5, wherein at least about 99% of the methane and at least about 65% of the $CO_2$ present in the impure feed gas stream are recovered in the purified methane product gas stream and the purified $CO_2$ product gas stream, respectively.

7. The two-stage gas purification process of claim 1, wherein the absorber and the stripper are maintained at a pressure from about 41 barg (600 psig) to about 83 barg (1200 psig).

8. The two-stage gas purification process of claim 7, wherein the one or more flash separators are maintained at pressures of less than about 27 barg (400 psig).

* * * * *